2 Sheets--Sheet 1.

I. DODENHOFF, dec'd.

WALTER A. WOOD MOWING AND REAPING MACHINE CO.

Harvester-Rake.

Reissued March 16, 1875.

No. 6,339.

Witnesses:
Alex Malone
H. C. Barclay

Walter A. Wood
Mowing & Reaping Machine Co
assignee of Israel Dodenhoff
by C. M. Smith, Atty.

THE GRAPHIC CO. PHOTO-LITH. 39 & 41 PARK PLACE, N.Y.

2 Sheets--Sheet 2.

I. DODENHOFF, dec'd.

WALTER A. WOOD MOWING AND REAPING MACHINE CO.

Harvester-Rake.

Reissued March 16, 1875.

No. 6,339.

Witnesses
Alex Mahon
H. C. Barclay.

Walter A. Wood
Mowing & Reaping Machine Co.
Assignee of Israel Dodenhoff
by A. M. Smith Atty

THE GRAPHIC CO. PHOTO-LITH. 39 & 41 PARK PLACE, N.Y.

UNITED STATES PATENT OFFICE.

WALTER A. WOOD MOWING AND REAPING MACHINE COMPANY, OF HOOSICK FALLS, NEW YORK, ASSIGNEE, BY MESNE ASSIGNMENTS, OF ISRAEL DODENHOFF, DECEASED.

IMPROVEMENT IN HARVESTER-RAKES.

Specification forming part of Letters Patent No. 18,009, dated August 18, 1857; extended seven years; reissue No. 6,339, dated March 16, 1875; application filed February 1, 1875.

*To all whom it may concern:*

Be it known that ISRAEL DODENHOFF, late of Bloomington, county of McLean and State of Illinois, did invent certain new and useful Improvements in Automatic Rakers, of which the following is a full, clear, and exact description, reference being had to the accompanying drawing, making part of this specification, in which—

Figure 1:
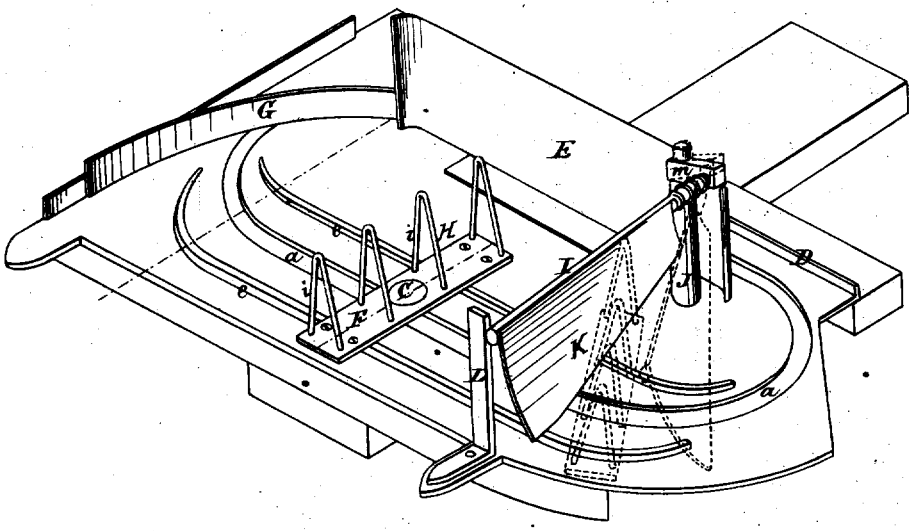
Figure 4:
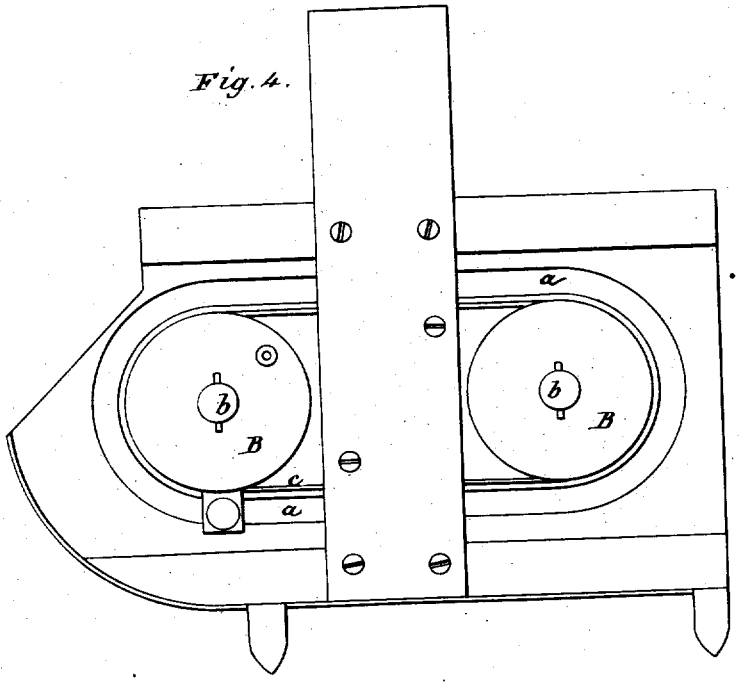
Figure 3:
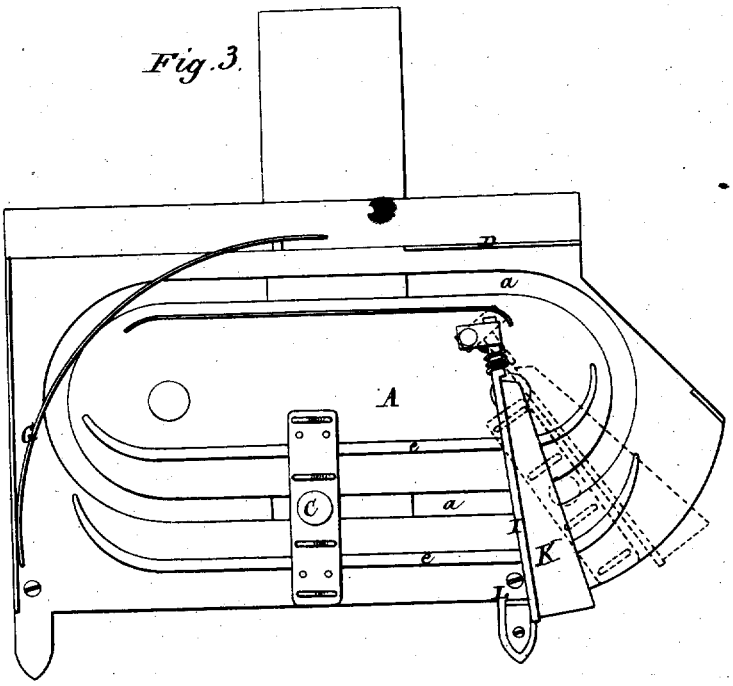
Figure 5:
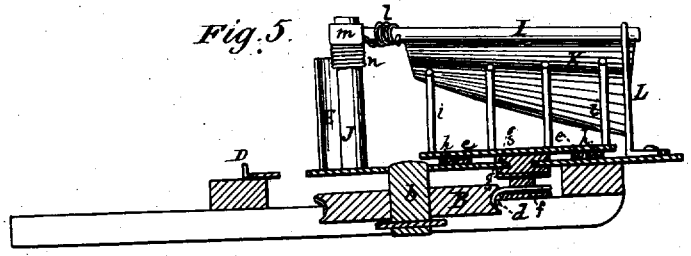
Figure 2:
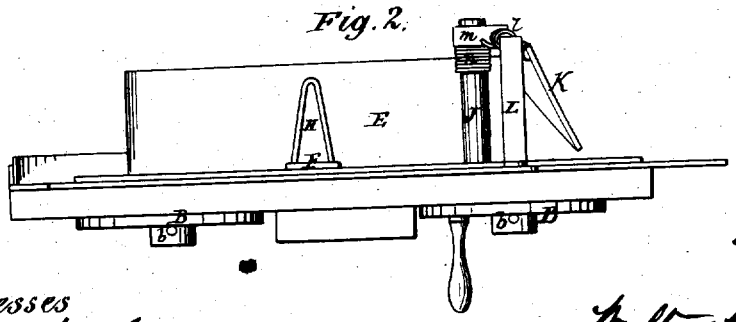

Figure 1 represents a perspective view of the platform with the rake applied; Fig. 2, a front elevation; Fig. 3, a plan; Fig. 4, an inverted plan, and Fig. 5 a vertical section.

The invention relates to certain improvements in the raking apparatus of harvesting-machines; and consists in the combination, with the grain-platform, of an automatic rake moving in an endless path over the surface of the platform, and stationary ways located on the platform, for changing and controlling the angle or position of the rake.

The platform A, for the reception of the grain as it is cut, is similar to those in general use, with the exception that it has an endless channel or slot, *a*, formed in it, through which the rake is connected with its driving mechanism. On the under side of the platform, surrounded by the endless channel *a*, and at the curves therein, are arranged studs *b*, upon which pulleys B B are mounted, to one of which motion is communicated, in any suitable manner, from the driving-wheel of the reaper. Around these pulleys B B is passed an endless chain or belt, *c*, provided with a belt hook or arm, *d*, having a bearing for the reception of a wrist, C, on which the rake is mounted. This wrist has a collar or flange, *f*, on its lower end to prevent it from sliding off the belt-hook *d*, there being two lips or flanges, *g* and *g'*, secured upon it—the one arranged above and the other below the platform—which assist in guiding the wrist C in the endless channel, and in confining the rake to the platform when in motion. By this arrangement the rake is moved in an endless path, while a free play around its center is allowed, so that the relative position of the rake—or, in other words, its angular position with respect to its path—while passing over different parts of the platform, can be changed as required. In the rear of the platform, and on both sides of the endless channel *a*, are secured guide bars or frames D E, for the purpose of guiding the rake or changing its angular position, so that its head is parallel with its path as it passes along that part of the platform on its return to recommence raking, the bar E extending upward, and serving also as a guard or fender for keeping it free from the falling grain on its return movement. On the front part of the platform, and at the sides of the endless channel *a*, are also secured guide-rails *e*, for the purpose of controlling the angular position of the rake with reference to its path while in the act of raking, there being, for this purpose, guide-pieces *h* formed with or secured to the under side of the rake-head F, by means of which, when brought in contact with the guide-rails *e*, the rake is turned at right angles to its line of motion, and, therefore, broad side to the grain, for the purpose of sweeping it across the platform in a line parallel with the cutters, or nearly so.

That the rake may not turn too far around, and thus prevent the guide-blocks on the under side of the rake-head from engaging with the rails, a curved spring-guide, G, is secured at the curved part of the endless channel *a*, next the standing grain, for guiding the rake to the guide-rails *e* as it passes to the front of the platform. The rake H is composed of a series of rods or teeth, *i*, secured to a head, F, which is connected to the wrist C. The gate, against which the grain is compressed as the rake advances, is formed of a plate or board, K, attached to a rocking beam, I, pivoted through the medium of a block, *m*, upon the upper end of a standard, J. The block *m*, which supports the compressing-board K, is free to swing or turn upon the standard J in moving with the rake to the point of discharge, from which it is retracted to its normal position against a standard, L, by a coiled spring, *n*, surrounding the standard J, and connected at one end therewith, and at the opposite end with the block *m*. For giving increased stiffness to the board, and preventing its pivot from turning too easily in the block *m*, a coiled spring, *l*, is employed, surrounding the pivot and connected at one end therewith, and at its opposite end with the block *m*.

When the machine is put in operation the rake, in moving over the front part of the platform, is kept in proper position by the rails *e*. On its arrival at or between the standards J and L it carries the board K with it, the gavel being compressed between the rake and the board, and finally deposits the grain in a compact bundle on the ground, when the board or gate K is retracted by the spring *n*, while the rake is directed along the rear of the platform by the guiding bars or frames D E until it reaches the curved guide G, which directs it to the rails *e* as it repasses to the front part of the platform to renew the operation of raking.

Having thus described the invention, what is claimed as new, and sought to be secured by Letters Patent, is—

1. The grain-platform of a reaping-machine, provided with a guide for controlling the position or angle of an automatic rake moving in an endless path over said platform.

2. An automatic grain-rake, in combination with actuating mechanism located underneath the platform, and a guide on the platform for controlling and changing the angular position of the rake relative to its path, the combination being substantially such as described.

WALTER A. WOOD MOWING AND REAPING MACHINE COMPANY,

By WALTER A. WOOD, *President.*

Witnesses:
A. C. EDDY,
A. T. SKINNER.